United States Patent [19]
Nowak et al.

[11] Patent Number: 5,664,890
[45] Date of Patent: Sep. 9, 1997

[54] BEARING ARRANGEMENT HAVING A POLYIMIDE GRAPHITE-FIBER REINFORCED COMPOSITE EMBEDDED THEREIN

[75] Inventors: Bernard E. Nowak, Westlake; Joseph P. Reardon, Fairview Park, both of Ohio

[73] Assignee: Hycomp, Inc., Cleveland, Ohio

[21] Appl. No.: 687,193

[22] Filed: Jul. 25, 1996

Related U.S. Application Data

[62] Division of Ser. No. 336,986, Nov. 10, 1994, Pat. No. 5,549,394.

[51] Int. Cl.⁶ .................................................. F16C 33/22
[52] U.S. Cl. ........................ 384/282; 384/275; 384/284; 384/297; 384/420
[58] Field of Search ................................ 384/282, 284, 384/285, 275, 297, 298, 299, 420, 425

[56] References Cited

U.S. PATENT DOCUMENTS

| | | | |
|---|---|---|---|
| 379,531 | 3/1888 | Douglas, Jr. ........................ | 384/285 |
| 1,854,597 | 4/1932 | Mikaelson ........................ | 384/425 X |
| 3,436,129 | 4/1969 | James ........................ | 384/282 |
| 4,036,540 | 7/1977 | Seufert ........................ | 384/282 |
| 4,252,378 | 2/1981 | DeBolt et al. ........................ | 301/63 DD |
| 4,468,138 | 8/1984 | Nagel ........................ | 384/420 X |
| 4,678,699 | 7/1987 | Kritchevsky et al. ........................ | 427/175 |
| 4,692,291 | 9/1987 | Angell, Jr. ........................ | 264/109 |
| 4,714,730 | 12/1987 | Briggs et al. ........................ | 524/321 |
| 4,745,018 | 5/1988 | Chihara et al. ........................ | 428/141 |
| 4,756,631 | 7/1988 | Jones ........................ | 384/95 |
| 4,810,444 | 3/1989 | Alberino et al. ........................ | 264/102 |
| 4,959,405 | 9/1990 | Briggs et al. ........................ | 524/321 |
| 5,126,085 | 6/1992 | Thorp et al. ........................ | 264/112 |
| 5,233,743 | 8/1993 | Robertson et al. ........................ | 29/527.1 |
| 5,422,150 | 6/1995 | Scoular et al. ........................ | 428/33 |

OTHER PUBLICATIONS

Metaline® Phenolic Wear Plates brochure, 1984, Spadone-Alfa Corporation, Norwalk, Connecticut.
Hycomp Self-Lubricating Wear Products brochure, HyComp, Inc., Cleveland, Ohio.
Wear Comp Wear Liners brochure, Apr. 1994, HyComp, Inc., Cleveland, Ohio.
Wear Comp Wear Liners brochure, Jan. 1994, HyComp, Inc., Cleveland, Ohio.
Product brochure entitled "Slipper Pads for Articulated Spindles." No Date.
Product brochure entitled "Coupling Boxes With Interchangeable Inserts." No Date.
XTEK Product brochure. No Date.

*Primary Examiner*—Thomas R. Hannon
*Attorney, Agent, or Firm*—D. Peter Hochberg; Mark Kusner

[57] ABSTRACT

A bearing arrangement comprised of a substrate having a plurality of self-lubricating polyimide graphite-fiber reinforced composite bearing members secured to provide a bearing surface. The bearing arrangement being well suited for use under harsh conditions, including high temperatures, high impacts, and large loads.

5 Claims, 8 Drawing Sheets

BEARING ARRANGEMENT HAVING A POLYIMIDE GRAPHITE-FIBER REINFORCED COMPOSITE EMBEDDED THEREIN

This is a divisional of application Ser. No. 08/336,986 filed on Nov. 10, 1994 U.S. Pat. No. 5,549,394.

FIELD OF THE INVENTION

The present invention relates generally to a bearing arrangement comprised of a substrate embedded with a polyimide graphite-fiber reinforced composite wherein the bearing arrangement is particularly suitable for use under harsh conditions, including large loads, high impacts, and high temperatures. More particularly, the invention relates to a bearing arrangement in which the substrate is configured, such as with a plurality of recesses or holes, to receive the polyimide graphite-fiber reinforced composite. The polyimide graphite-fiber reinforced composite is self-lubricating, is very wear-resistant, has high impact strength, and functions as a structural component of the bearing arrangement.

BACKGROUND OF THE INVENTION

A bearing is defined as a means of positioning one part with respect to another in such a way that a relative motion is possible. This relative motion and its type are dictated by the requirements of the arrangement of which the bearing will be a part. Bearings are designed by determining the mechanical functions which the bearing must perform, the requirements on life and reliability and the ambient conditions, including temperature, corrosive atmospheres, and vibration.

The two major classes of bearings are: (1) sliding bearings, in which the bearing elements are usually separated by a film of lubricant (e.g., oil or grease) and in which a sliding motion is the predominant element, and (2) rolling-element bearings of which ball bearings, roller bearings, and needle bearings are examples.

Slider-type bearings include all varieties of bearings in which the primary motion is a sliding of one surface over another. Accordingly, all types of journal or sleeve bearings which are used to position a shaft or movable part in a radial direction are slider-type bearings. Furthermore, all types of thrust bearings, which are used in general to prevent movement of a rotating shaft in an axial direction and as guides for linear motion of various types, are also slider-type bearings. Thrust bearings vary widely in design as well, ranging from simple, flat thrust collars to complex tapered-end and pivoted-shoe (i.e., Kingsbury) bearings. Some journal and thrust bearings are designed to operate with a lubricant supply under sufficient external pressure so that the load is carried by this pressure rather than by the hydrodynamic forces generated by the sliding motion. Other bearings move slowly enough, or intermittently, or under light enough loads so that separation by a film of lubricant is not necessary for satisfactory performance and life. In this case, the surfaces are allowed to rub on each other with only the boundary-lubrication properties of the lubricant preventing seizure and wear.

Rolling-element bearings include ball bearings, roller bearings, and needle bearings. Both ball and roller bearings are made and designed to carry either radial or thrust loading or both. Needle bearings, in general, are restricted to radial loads.

Prior art lubricants vary widely from fluids of all types, including water, oil, soaps, greases and air, to solid lubricants such as graphite and molybdenum disulfide.

Among the mechanical requirements to be considered in choosing a bearing are the load to be carried and the character of the load, the surface velocity which can be tolerated by the bearing, the ability of the bearing to tolerate misalignment, the friction when starting the bearing under a load, the power consumption of the bearing, the space requirement, the type of failure that may occur, the damping capacity, and the lubrication requirements.

With regard to load, the load-carrying capacity of a slider-type bearing is very much a function of speed and of lubricant viscosity. Starting under load can cause damage in slider-type bearings due to a shearing failure during that period before the lubricant film is formed and a lowering of the friction at the rubbing interface takes place. In many cases the possibility of shearing failure limits the load which can be carried.

As to speed, slider bearings are limited by the temperature rise created by high-speed shearing action in the lubricant; and, in general, high surface speed demands relatively large clearances, low-viscosity lubricants, and large lubricant flows to remove heat. In addition to these effects, turbulence has been found to occur in the slider-type-bearing lubricant films when operating at very high speeds; and this turbulence, which greatly increases at rate of temperature rise with increasing speed, places an effective upper limit on slider-bearing velocities.

With respect to misalignment, it is a desirable mechanical characteristic in many bearing applications if the bearing can tolerate misalignment, including shaft deflections arising from changes in loading during operation, thermal gradients which cause differential expansion, and inaccurate machining and line-up. Other types of misalignment, which involve adjustment during operation, in general require that the misalignment be accommodated by the bearing structure itself.

As to friction, low starting friction, particularly when starting under load, is an advantageous characteristic of a bearing. With respect to power consumption, reduced power consumption is advantageous as well.

With regard to the space requirements, slider-type bearings can occupy less space in the direction of load support (i.e., in the radial direction for journal bearings, and in the axial direction for thrust bearings), than roller bearings.

With respect to failure, slider-type bearings offer some advantages over roller-element bearings in the event of failure of the lubricant supply because sliding can often occur on the bearing metal for an appreciable period of time without serious dislocation of the position of the moving parts. This contrasts with rolling-element bearings, particularly ball bearings, which where in failure to maintain a lubricant film on the moving parts results very quickly in severe damage to the bearing and in serious dislocation of the moving parts as rolling elements are lost, shattered or flattened.

As to damping, slider-type bearings contain within their lubricant film a certain amount of inherent damping capacity represented by the time and pressure required to reduce the lubricant-film thickness. Damping is the ability to reduce the magnitude of vibration by absorbing a portion of the vibrational energy.

With regard to lubrication, slider-type bearings, in general, require relatively large amounts of lubricant (e.g., oil) in order to maintain the lubricant film between the surfaces. Unless the loads are very low, the pressure that is generated in the lubricant film to support the load also drives lubricant out of the bearing. Lubricant lost in this manner must be replenished continuously. Specially designed slider bearings may also operate on air or gas as the hydrodynamic fluid, or as the fluid supply in externally pressurized bearings.

The environmental conditions to be considered in regard to choosing bearings, includes operating and starting temperatures, and corrosion.

With respect to operating temperature, slider-type bearings can be constructed to withstand temperatures as high as the lubricant can tolerate. As to starting temperatures, the ability to start at low temperatures is often necessary for equipment that must operate outdoors, particularly in northern climes and in aircraft. Rolling-element bearings are advantageous where low starting temperatures are a requirement, since the greater area of lubricant which must be sheared during the starting of the slider-type bearing requires application of more torque to start.

With regard to corrosion, sliding-type bearings often can be designed and constructed from corrosion-resistant materials for any particular application because of the wide range of materials available.

There are also economic factors to be considered in the selection of bearings. In this respect, the principal economic factors are life and reliability, maintenance, ease of replacement and cost. Slider-type bearings, when properly designed and when operating under reasonably uniform loading, have a virtually unlimited life. However, the lubricant-supply system of a sliding bearing will require occasional attention for replacement of the lubricant, change of filter, or general cleaning.

As to cost, slider-type bearings can be produced at very small cost in mass-production quantities, but their cost can be very large, when they have to be machined in small quantities for special designs.

As indicated above, journal bearings are one type of sliding bearing. Journal bearings are classified roughly according to the method of lubricant feed to them, as (a) non-pressurized bearings, (b) pressure-fed bearings, or (c) externally pressurized bearings.

Examples of non-pressurized bearing are bushings, wick-oil bearings and oil ring bearings, the bushing being the simplest type of journal bearing. In general, these bearings are used at low speeds and moderate loads, and careful attention must be paid to the selection of the proper bearing material and shaft material to be used.

A bushing is a sleeve of bearing material in which a shaft rides. Depending upon the application, the bushings may be run dry or they may be oiled, or grease-lubricated. In general, bushings operate at such slow speeds that it is questionable whether hydrodynamic lubrication conditions prevail and a whether complete oil film separates the bushing from its shaft. Thus, boundary lubrication is an ordinary operating condition for bushings, and the selection of both the lubricant and the bearing material becomes very important. The simplest bushing may be nothing more than a hole drilled and reamed in the structure of the machine. This may be satisfactory in a cast-iron or aluminum housing where the loads and speeds are nominal. However, the bearing material is thereby restricted to a material selected primarily on the basis of its structural and machining properties.

Wick-oil bearings receive a continuous supply of lubricant from a wick which is saturated with oil. These bearings are usually used for shafts less than one inch in diameter and running at speeds of 3,600 rpm or less. When properly designed, wick-oil bearings appear to operate under very nearly hydrodynamic conditions. The wick rubbing on the shaft's surface through a window in the top of the bearings supplies oil to the surface. Oil leaving the bearing is normally retained by some form of seal and returned by gravity to the wick. Thus, the wick provides a miniature oil-circulation system for the bearing. It also serves a secondary function of filtering the oil supply to the bearing.

Oil-ring bearings are generally used for horizontal shafts. The bearing receives its lubricant through a window at the top of the bearing through which the oil ring contacts the shaft. The oil ring is considerably larger in diameter than the shaft and passes below the bearing, dipping into a reservoir or oil beneath the shaft. The oil-ring is rotated by contact with the rotating shaft and transfers the oil picked up from the reservoir to the shaft at the top of its cycle. Spreader grooves are used to distribute the oil from the window along the length of the bearing.

Pressure-fed bearings have lubricant (i.e., oil) which is fed under pressure. A pressure-fed bearing system includes a storage tank, a pump, either a full flow or bypass-type filter or centrifuge, a cooler, a pressure regulator, a temperature regulator, supply lines to the bearings, and return lines from the bearings (which drain the lubricant from the bearings back to the tank). This type of bearing is normally used in large fixed insulations, such as power houses, and other equipment where reliability is particularly important. Because of the provision for cooling, the pressure-fed bearing is advantageous for use with high speed machinery where the heat-rejection rate is too large for normal static cooling.

There are a number of designs for pressure-fed bearings which are commonly used. Variations lie in the shape and location of the lubricant grooves and in the shape of the bearing bore. In most instances, the bearing is split into at least two halves, primarily for ease of assembly into various parts of a machine such as a turbine. The types of pressure-fed bearings include circumferential-groove, cylindrical, cylindrical overshoot, pressure, multiple groove, elliptical, elliptical overshot, three-low, pivoted-shoe, nutcracker and partial.

Externally pressurized bearings, such as pocket bearings and hydrostatic bearings, depend upon lubricant (i.e., oil) pressure from an external pressure source to support the bearing load. This differs from hydrodynamic bearings, which depend upon lubricant pressures generated in the lubricant film to support the load.

As indicated above, thrust bearings are a second type of sliding bearing. The types of thrust bearings include low-speed bearings, which largely depend upon boundary lubrications, types which operate on hydrodynamic principals and externally pressurized thrust bearings.

The flat-land type thrust bearing is comprised of a runner or collar on the shaft which bears against a flat stationary bearing surface. Ordinarily, lubricant (i.e., oil) is fed to the center of the bearing and out over the bearing surface in six to eight lubricant grooves. This type of bearing is useful only for low loads, in the range of 50 to 100 psi maximum. Bearing wear, overheating, and failure can result from imposition of loads which are too high.

The tapered-land thrust bearing is a modified grooved flat-land bearing. The flat surface between grooves is cut away in order to provide a taper in the direction of shaft motion. The tapered-land thrust bearing has high low-carrying capacity in only one direction, unlike the flat-land bearing which will run equally well in either direction. In the forward direction, the tapered-land bearing can carry loads as high as 500 to 1,000 psi.

The pivoted-shoe thrust bearing is commonly known as the Kingsbury bearing. The stationary bearing member is split into three or more shoes, each of which is then pivoted at its center. Because each shoe adjusts to give an optimum lubricant-film taper, a pivoted-shoe thrust bearing can carry high loads over a wide range of speeds and when running in either direction.

A tapered-land thrust bearing can carry loads as high as the pivoted-shoe design, but only at the design speed. On the other hand, the pivoted-shoe bearing is inherently more costly to manufacture and requires careful attention to the lubricant supply. Spring-supported flexible-plate thrust bearings are machined to very close tolerances as a flat plate and is then supported on nests of pre-loaded coil springs. Both the bearing and the runner normally are grooved in order to provide good oil distribution.

A step thrust bearing has a lubricant-film thickness which is reduced sharply at a dam or step. The step thrust bearing is particularly useful as a small thrust bearing where the very slight depression of the step can be produced either by a coining process or by etching with acid.

A pocket thrust bearing provides the advantages of the externally pressurized bearing without the disadvantage of maintaining an external high-pressure pump. Lubricant (i.e., oil) from the lubricant groove is carried over the pumping end section and into the large pocket area. Since the lubricant carried is restricted from leaking out around the boundaries of the pocket, a lubricant pressure sufficient to carry the imposed load is generated by hydrodynamic principles.

Bearings can also be classified by the type of material used for construction. The classes of bearings include plain bronze, sintered, nylon, polytetrafluoroethylene (i.e., PTFE or Teflon®), molded-fabric, hardwood, east iron, steel, and carbon-graphite.

Bronze bearings are comprised of alloys which range from those containing aluminum for hardness to those containing large quantities of lead for softness and lubricity. Grease or oil are used as lubricants. Bearings constructed of bronze are most suitable for slow or medium motion under loaded conditions. Typical uses of bronze bearings are for heavy-machinery service, such as in the manufacture of press cranks, sleeves, electric motors, engine piston pins, and automotive kingpins.

Sintered bearings are comprised of metal powder, with or without graphite, compressed to the desired form, and sintered at high temperatures to develop strength. The metal usually used includes bronze, lead-bronze, iron, and iron-copper. Grease, or preferably oil, are employed as lubricants. Typical uses of sintered bearings include electric motors, generators, pumps, compressors, transmission components, and construction and textile machinery.

Nylon bearings are comprised of a polyamide resin. Nylon bearings can be lubricated with water or oil, or can be run dry. However, when nylon bearings are run dry the loads and speeds are limited. The typical applications for nylon bearings are food, bakery, textile and dairy machinery, automotive kingpins and steering linkages.

Teflon® bearings are comprised of polytetrafluoroethylene (PTFE). Under mild conditions Teflon® does not need a lubricant. However, oil or water can be used as lubricants where the loads and speeds are greater. The applications for Teflon® bearings are the same as those for nylon bearings, as discussed above.

Molded-fabric bearings are laminates composed of a fabric, such as cotton, impregnated with a phenolic or similar resin and molded under heat and pressure. They can be lubricated by oil, grease, or water, provided operating conditions are not severe. If the operating temperature of a molded-fabric bearing can be kept within reasonable limits (i.e., below 150° F.), by means of air, water or oil cooling and lubrication, it can withstand heavy usage. Typical applications include the operations of dairy equipment, food and textile machinery, mill roll necks, and pumps.

Hardwood bearings are comprised of woods such as lignum vitae, oak or elm. Bearings comprised of lignum vitae are self-lubricating under medium speeds and low loads, or under high speeds and light loads. However, for heavy loads of up to 2,000 psi and speeds of up to 200 rpm, water lubrication is desirable. Hardwood bearings of other woods usually require oil lubrication. Hardwood bearings find typical uses in textile equipment, food machinery conveyors, marine propeller shafts, and mill roll necks.

Bearings made of cast iron are only suitable for low to moderate loads. Cast iron bearings are lubricated with oil or grease. Suitable applications include water pumps and simple hand-operated machinery. One major problem with cast iron bearings is the formation of rust.

Bearings made of steel are typically used in applications such as drill guides in jigs and fixtures, and grinder spindles. Steel bearings are lubricated with oil.

Carbon-graphite bearings are used where temperatures are high, where lubrication is impractical or impossible, and where corrosion or chemical action rules out other materials. Accordingly, carbon-graphite bearings are normally used where bearings must run dry or submerged in a fluid. Typical uses of carbon-graphite bearings include electric motors, conveyors, and submerged mechanisms. One problem with carbon-graphite bearings is that they are brittle and subject to cracking.

Other prior art materials include those sold under the marks METALINE, MICROPOLY, and GENR. METALINE is comprised of a bronze or a phenolic substrate having recesses plugged with a non-fibrous graphite material. The non-fibrous graphite material functions solely as a lubricant for the bronze or the phenolic substrate. Furthermore, the non-fibrous graphite material will pulverize or fall out under large loads, thereby preventing this material from functioning as a structural component of the bearing arrangement. Therefore, the non-fibrous graphite material of METALINE is not suitable as a load bearing material. In addition, the phenolic substrate is suitable for continuous operation only at temperatures up to 248° F. MICROPOLY is comprised of a bronze substrate having recesses filled with a nylon. The nylon is not a polyimide, consequently, it will creep and distort under load. Accordingly, this material is also deficient as a load bearing material. GENR is a relatively soft material having low flexural strength. GENR is typically used in jet engines as the bearings for the variable stator vanes. This material is made with a braid of a stretch-broken carbon yarn and thus lacks the mechanical properties necessary to resist large impacts and the wear properties necessary for use in bearing applications.

Among the drawbacks to the bearing materials discussed above is that there are some applications wherein the bearings may be difficult to access or time consuming to lubricate. In the case of oil and grease lubricants, there are also environmental hazards and high disposal costs. Moreover, the lubricant itself may be costly. In situations where equipment must be shut down in order to lubricate bearings, the cost of downtime can be very high. Other drawbacks to the bearing materials discussed above is that they may not be well suited to applications where the environment or rubbing surface temperatures are high (e.g., 500° F.), where loads (i.e., pressure) may exceed 1000 psi, where speeds may exceed 100 rpm, and where there are high impact forces.

An alternative to the foregoing materials is a polymer composite material having a thermoset polyimide and carbon fibers. One such polymer composite material is derived from a sheet molding compound (SMC). SMCs are comprised of a thermosetting resin matrix, reinforcing fibers and sometimes other modifiers, in sheet form. The possible resin matrices include polyesters, epoxies, vinyl esters, phenolics and the like. The reinforcing materials may take the form of graphite fibers (a.k.a. carbon fibers), glass fibers, ceramic fibers, or combinations of the preceding, together with non-reinforcing fillers, depending upon the desired properties.

In particular, the polyimide sheet molding compound disclosed in U.S. Pat. No. 5,126,085, which is incorporated herein by reference, is particularly well suited as a material for bearings and bearing surfaces. This material is known commercially as WearComp®. It is comprised of a PMR-15 polyimide resin (a high temperature thermosetting resin) and 0.125 inch to 2.0 inch graphite fibers which are used as reinforcing materials. This polyimide SMC yields cross-linked products having a room-temperature tensile strength in the order of from about 45,000–50,000 psi and a modulus of about 5 Msi. The cross-linked polyimide products display a useful life of over 2,000 hours at temperatures in excess of 550° F., and up to 1,000 hours at 600° F. In addition, they provide char yields on the order of 70%, providing an insulating barrier against the spread of flame. The characteristics of the polyimide composite material includes low friction, high wear resistance, low creep, good dimensional stability, superior impact resistance, and self-lubrication. Consequently, it lends itself to a variety of applications including the fabrication of self-lubricating parts, and for high temperature uses such as engine parts and aircraft brakes.

Table I set forth below provides the mechanical properties for HyComp 310, ™ which is one of the WearComp® composites.

TABLE I

| Typical Mechanical Properties of HyComp 310 ™ | |
|---|---|
| Tensile Strength | Ksi |
| 73° F. | 49 |
| 500° F. | 44 |
| Flexural Strength | Ksi |
| 73° F. | 80 |
| 500° F. | 75 |
| Flexural Modulus | Msi |
| 73° F. | 5.6 |
| 500° F. | 5.2 |
| Compressive Strength | Ksi |
| 73° F. | 103 |
| 600° F. | 63 |
| Impact, Notched Izod | 12 ft. lb/in. |

Although the WearComp® composites have the foregoing notable characteristics, they also have a relatively high material cost as compared to other materials. Accordingly, it would be advantageous to provide the bearing or wear surfaces of a bearing component with the qualities of a WearComp® composite while using as little composite as possible. This substantially reduces the material cost of the bearing component, particularly where the bearing component is relatively large.

As indicated above, a typical bearing arrangement requires a lubricant, such as oil or grease for proper operation. Accordingly, these bearing arrangements will require periodic maintenance to replenish or replace the lubricant. In some cases, when a particular piece of machinery is shut down for servicing, consequently requiring shutting down of a line of machines, the cost of downtime can be as much as $650–$700 per minute.

One situation in which a bearing arrangement is used under harsh conditions (e.g., large loads, high impacts and high temperatures), in which the bearing components are relatively large, and the downtime costs can be very high, is in metal processing factories, such as steel or aluminum mills. With regard to mills producing rolled sheet steel, coated sheet steel and mill products (e.g., tin plate and chromium-coated steels), bearing arrangements are used in equipment such scale breakers, roughing stands, finishing stands, vertical edgers, coilers, pay-off reels, steering rolls, shears, recoilers, and welders. It will be appreciated that while the present invention is particularly well-suited for bearing arrangements in a steel or aluminum mill, and is described with particular reference thereto, it also finds use in components used under similarly harsh conditions.

SUMMARY OF THE INVENTION

According to the present invention there is provided a bearing arrangement having at least one bearing surface. The bearing arrangement comprises a substrate having a structural load bearing component. The structural, load bearing component comprises a thermoset, polyimide composite reinforced with graphite fibers, and attached to the substrate by means of embedment or physical attachment.

It is an object of the present invention to provide a bearing arrangement which is particular well suited for use under harsh conditions, including frequent and large loads, high impacts, and high operating temperatures.

It is another object of the present invention to provide a bearing arrangement which can withstand continuous operation at temperatures as high as 600° F.

It is another object of the present invention to provide a bearing arrangement which can withstand high compressive loads.

It is still another object of the present invention to provide a bearing arrangement which is self-lubricating.

It is a further object of the present invention to provide a bearing arrangement which can withstand high impacts.

It is yet another object of the present invention to provide a bearing arrangement which is wear resistant.

It is still another object of the present invention to provide a bearing arrangement having a polyimide composite which functions as a structural component of the bearing arrangement.

These and other objects and advantages will become apparent from the following description of preferred embodiments taken together with the accompanying drawings.

BRIEF DESCRIPTION OF THE DRAWINGS

The invention may take physical form in certain parts and arrangement of parts, preferred embodiment of which will be described in detail in the specification and illustrated in the accompanying drawings which form a part hereof and wherein.

DETAILED DESCRIPTION OF PREFERRED EMBODIMENT

One element in the preferred embodiments of the present invention is a small member, such as a "button" or "disk" formed of a polyimide graphite-fiber reinforced composite. The polymer composite is preferably a WearComp® composite material having the composition and properties discussed above. However, the buttons may be formed of alternative polymer composite materials having properties similar to the WearComp® composites, including materials comprising bis-imides. For instance, alternative materials may be comprised of different high temperature thermosetting resins and different reinforcing materials. Moreover, alternative materials may include bulk molding compounds (BMCs) and laminates formed of a thermoset polyimide and graphite fibers. The graphite fibers are generally shorter in BMCs than in SMCs. In this respect, the length of graphite fibers is generally in the range of approximately 0.125 inch to 0.25 inch for BMCs, whereas the length of graphite fibers is generally in the range of approximately 0.25 inch to 2.0 inches for SMCs. Laminates have a woven or nonwoven continuous graphite fiber. It will be appreciated that the graphite fibers and thermoset polyimide provide the desired friction and wear properties of the material, while the length of the graphite fiber determines the mechanical properties (e.g., impact strength) of the material.

The buttons, according to the preferred embodiment of the invention, are formed by production of a mixture of fiber and resin in the form of a sheet having a thickness of approximately 0.10 to 0.25 inch and having the consistency of putty. The sheets are put in a die cutting press to form circular sheets. The circular sheets are then built up to several plies, the number of plies depending upon the desired thickness of the resulting disk or button. The multiply disks are then heated to approximately 610° F. at approximately 2000 psi, for approximately 60 minutes. The applied heat and pressure cause the chemical curing of the composite material. The cured buttons have a diameter in the range of approximately 0.5 inch to 1.5 inches and a thickness in the range of approximately 0.0625 inch to 1.0 inch. It will be appreciated that the cured buttons may also have larger dimensions for the diameter and thickness. Furthermore, while the "buttons" or "disks" take a generally circular shape in the preferred embodiments of the present invention, they may take other geometric shapes, including squares and triangles. The bearing faces can vary according to the usage; some faces could be flat, curved, etc.

The buttons are supported in a substrate that acts as a matrix and which comprises a portion of the bearing arrangement. The preferred means of fixing the buttons to the substrate is interference fit tons in a recess or hole using an interference fit to hold them in place. Alternatively, the buttons can be held in place in the recess by use of chemical bonding (i.e., adhesives), mechanical attachments, and the like. It will also be appreciated that the buttons may be attached to the substrate without embedding the buttons within a recess or hole in the substrate. In this regard, the buttons may be attached to the surface of the substrate by chemical bonding (i.e., adhesives), fasteners, mechanical attachments, and the like.

The substrate material is generally a metal such as bronze, brass or steel. The buttons are embedded by providing a recess or hole in the substrate which generally conforms to the dimensions of the button. In this respect, the recess or hole has slightly smaller dimensions than the buttons (e.g., a diameter 0.0015 inches to 0.005 inches smaller than the diameter of the buttons) so that the buttons can be embedded in the substrate using an interference fit. Accordingly, a preferred method for embedding the buttons is to press fit them into the recess or hole using an arbor press or other suitable methods. As noted above, other methods of securing the buttons to the substrate are suitable as well, including the use of adhesives. Furthermore, the surface of the buttons may be arranged flush with the surface of the substrate, or protrude approximately 0.010 to 0.030 inch above the surface of the substrate. The surface of the buttons may also have a curvature so as to conform with a substrate having a curved surface. Such curvature being produced by use of a suitably radiused abrasive grinding wheel.

Preferably, especially in the steel or aluminum fabrication applications, the buttons should not comprise more than 50% of the surface area of the substrate, with 10–35% of the surface area of the substrate generally providing the best results. In this respect, if too many buttons are embedded in the substrate, the cost of the bearing arrangement will rise (due to the cost of the composite material which may be 4–6 times more expensive than the metal substrate material) without a corresponding increase in bearing performance. Moreover, in some cases, the integrity of the supporting component formed by the substrate may be put at risk. Accordingly, the optimal percentage surface area is determined by considering the material cost and the load which must be supported.

The buttons themselves are capable of withstanding loads as high as 100,000 psi, and are capable of functioning as a bearing at loads as high as approximately 50,000 psi (i.e., the engineering compressive strength). However, it will be appreciated that loads will typically be 3000 psi or less in many applications.

Importantly, the composite buttons provide a bearing surface as well as a lubricant. In this respect, the composite material imparts a lubricant film which appears as a smudge on mating parts which rub against the buttons. This lubricant film provides additional lubrication for the substrate (e.g., bronze) which may also provide a bearing surface.

Figure 1:
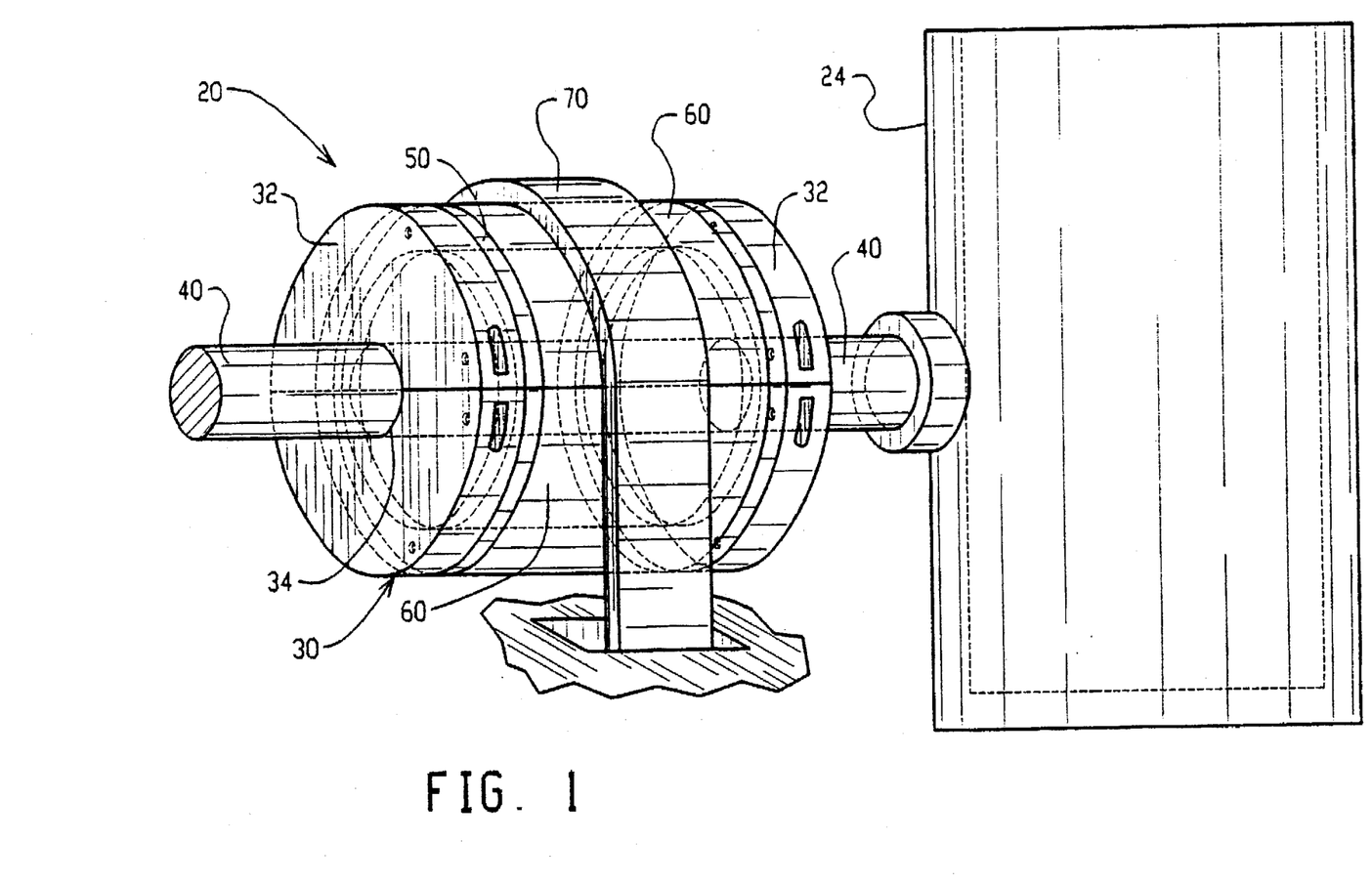
FIG. 1 is a perspective view of a pillow block assembly.

Referring now to FIG. 1, there is shown a half journal bearing arrangement for a pillow block assembly 20. Pillow block assembly 20 is used in a steel or aluminum mill to rotate a ladle 24 filled with molten metal. Pillow block assembly 20 is generally comprised of an adapter 30, a shaft 40, two pair of collar portions 50, a pair of half journals 60 and a pillow block housing 70.

Figure 2:
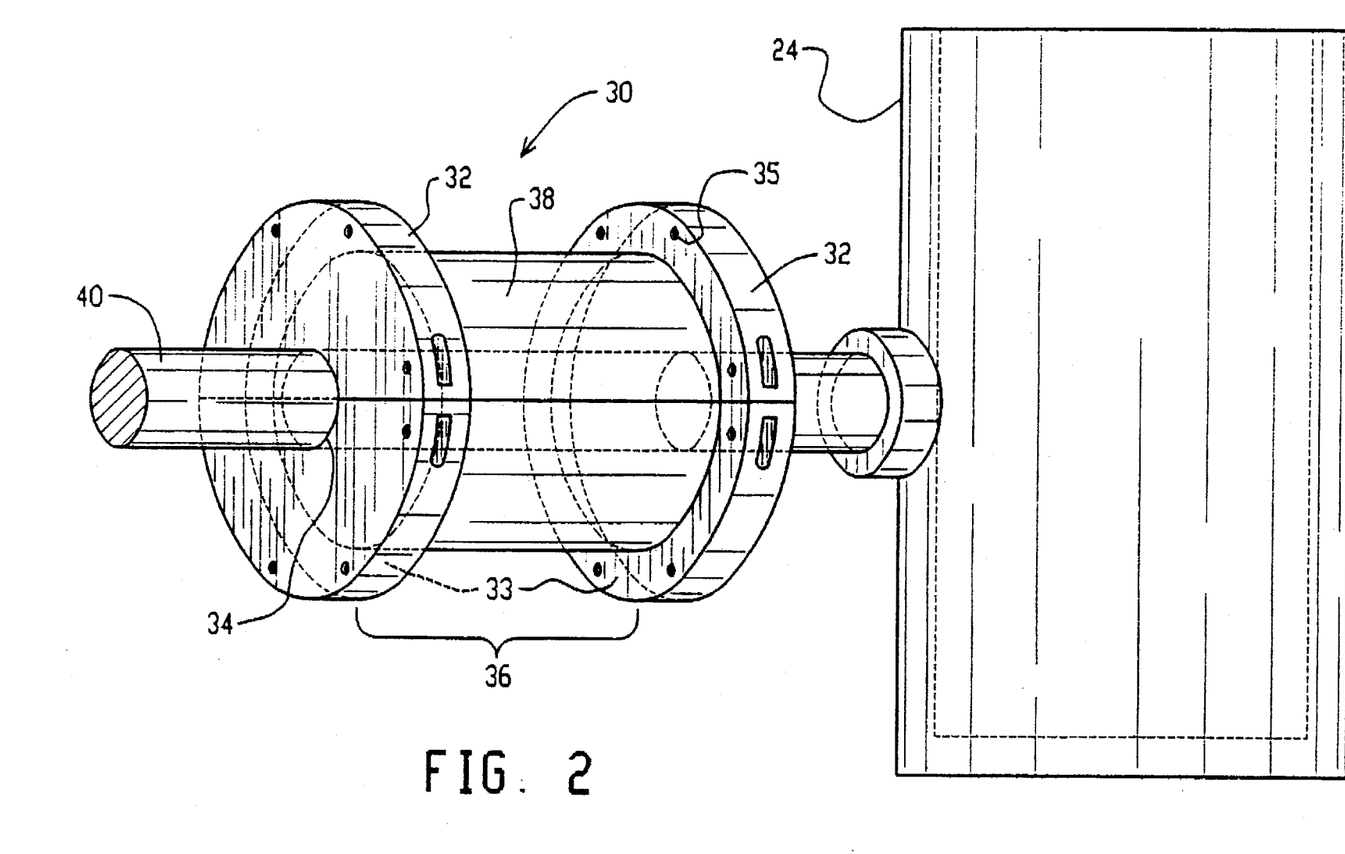
FIG. 2 is a perspective view of the adapter and shaft for the pillow block assembly of FIG. 1.

FIG. 2 shows adapter 30 with shaft 40 therethrough. Adapter 30 is comprised of a pair of generally half-cylindrical portions which are fastened together (e.g., by bolts) around shaft 40. Bore 34, which is formed by joining the two generally half-cylindrical portions, is dimensioned to secure adapter 30 to shaft 40 in a damping manner. Adapter 30 is generally cylindrical, having a center portion 38 and thrust faces or flanges 32 at opposite ends thereof. Inner surface 33 of flanges 32 have holes 35 for receiving fasteners that attach collar portions 50 to flanges 32. A gap 36 formed between flanges 32 is dimensioned to receive half journals 60. A ladle 24 attaches to shaft 40 at one end thereof. The other end of shaft 40 attaches to a drive motor (not shown), which rotates shaft 40.

Figure 3:
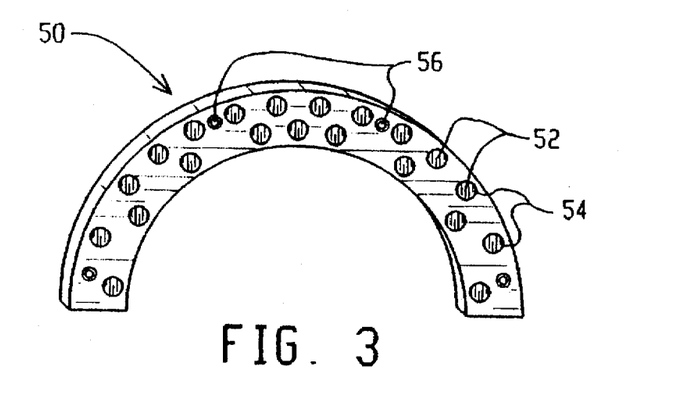
FIG. 3 is a perspective view of the collar for the pillow block assembly of FIG. 1.

Referring now to FIG. 3, there is shown a collar portion 50. Two (2) collar portions 50 form a ring. Collar portion 50 has a plurality of recesses or holes 54 for receiving composite buttons 52 and a plurality of holes 56 for receiving fasteners (e.g., bolts). It will be appreciated that recesses 54 may extend partially or entirely through the depth of collar portions 50. Composite buttons 52 are press-fit into recesses or holes 54 as discussed above. Furthermore, the composite buttons 52 are preferably comprised of the polyimide graphite-fiber reinforced composite, also as indicated above. Fasteners placed through holes 56 are used to secure collar portions 50 to inner surfaces 33 of flanges 32. A pair of collar portions 50 form a ring around center portion 38 of adapter 30. Accordingly, two rings are formed along flanges 32 of adapter 30. Preferably, the substrate of collar portions 50 is bronze.

Figure 4:
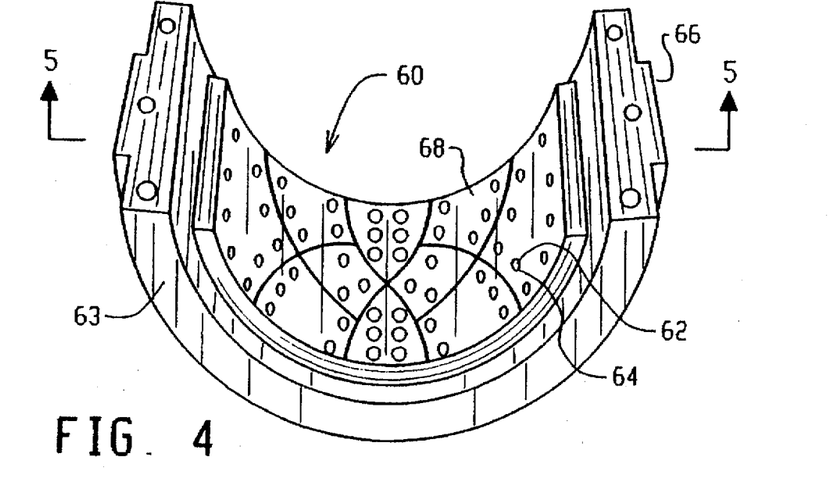
FIG. 4 is a perspective view of the half-journal for the pillow block assembly of FIG. 1.
Figure 5:
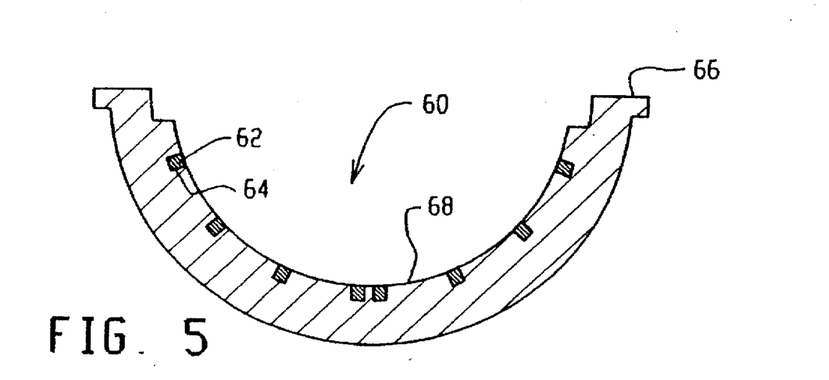
FIG. 5 is a sectional view of the half-journal of FIG. 4 along line 5—5.

FIG. 4 shows a half journal 60 having composite buttons 62 embedded in inner portion 68. Buttons 62 are press fit into recesses 64 formed along the inner portion 68 of half journal 60. Buttons 62 are preferably comprised of the same material as buttons 52 discussed above. An outer race 66 is formed along the outer surface of half journal 60. Pillow block housing 70 engages with outer race 66 to hold half journal 60 stationary as shaft 40 and adapter 30 rotate. A pair of half journals 60 are placed into gap 36 between flanges 32 as shown in FIG. 1. Accordingly, the inner portion 68 of half journal 60 faces center portion 38 of adapter 30. A cross-sectional view of half journal 60 is shown in FIG. 5.

Preferably, the substrate for half journal 60 is bronze. However, it will be appreciated that half journal 60 may be formed of a steel shell with a laminated material (e.g., a phenolic material with cotton as a reinforcing agent) fastened to the inner portion thereof. The laminated material includes holes or recesses 64 for receiving buttons 62.

When fully assembled, pillow block assembly 20 is arranged with shaft 40 extending through bore 34 of adapter 30. Collar portions 50 are attached to inner surfaces 33 of flanges 32, while the half journals 60 are attached to one another between collars 50, to form a cylinder surrounding center portion 38. Pillow block housing 70 is attached to half journals 60 by engagement with outer race 66.

During operation of pillow block assembly 20, shaft 40 rotates, which in turn rotates ladle 24. Accordingly, adapter 30 and collar portions 50 rotate with shaft 40. Pillow block housing 70 holds the two half journals 60 stationary as adapter 30 rotates. Therefore, adapter 30 and collar portions 50 will rotate relative to the two half journals 60 as shaft 40 rotates. This arrangement will cause inner portion 68 of each half journal 60 to bear against center portion 38 of adapter 30. Likewise, side portion 63 of each half journal 60 will bear against inner surface 33 of adapter 30. Furthermore, tiny explosions occurring in the molten metal will cause movement of ladle 24. Accordingly, there will be additional forces exerted upon half journals 60 and collar portions 30.

Figure 6:
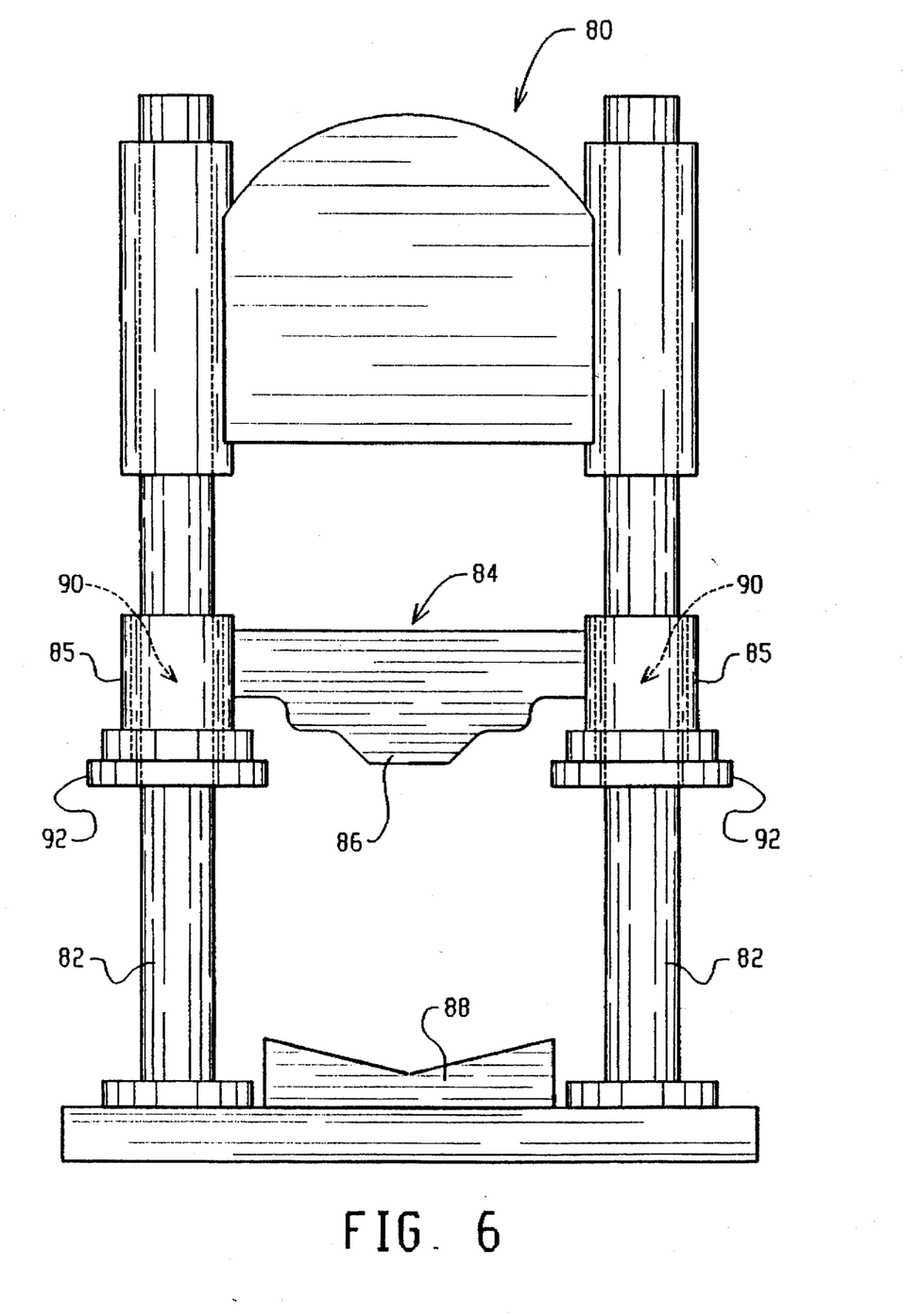
FIG. 6 is a front perspective view of a forging press.

Referring now to FIG. 6, there is shown a hot forging press 80. This is another application in which a half journal bearing arrangement is employed. Hot forging press 80 is comprised of a ram 84 supported by one or two pairs of steel columns 82 which are anchored to a single base casting of great weight and strength. Ram 84 points downward and carries an upper forging bit 86 vertically opposite a similar lower and stationary bit which rests on the base casting to which the columns are attached. Typically, hydraulics are used to move ram 84 up and down columns 82. The pressure exerted by the forging press is very great. In practice, it is found that the lowest pressure that can be employed to be effective at a full forging heat is about 1.2 tons per square inch, but the pressures typically employed will often reach over 13 tons per square inch.

A pair of half journals 90 are inserted inside tube 85 of ram 84. The inner surface of journals 90 slides against the outer surface of columns 82 as ram 84 moves up and down.

Figure 7:
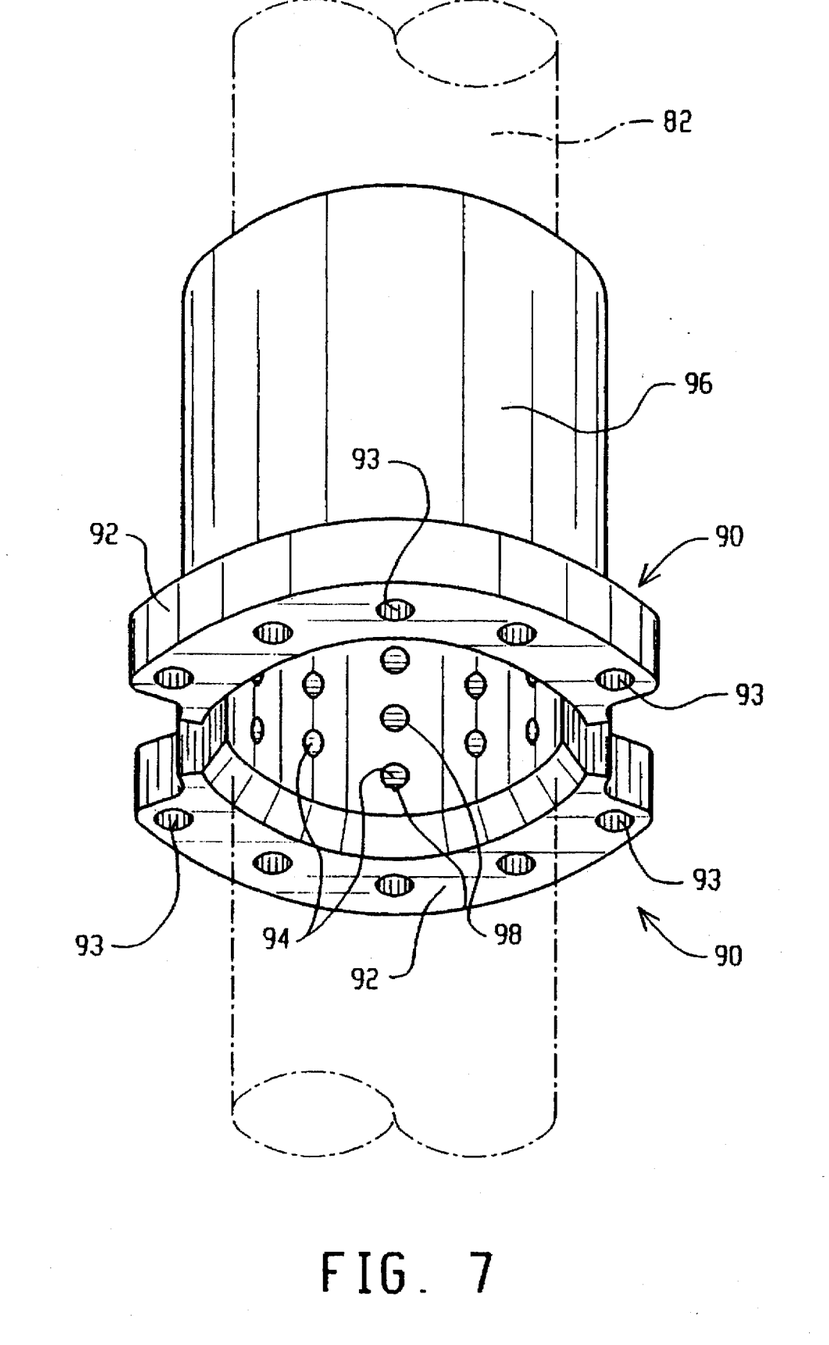
FIG. 7 is a perspective view of a hot forging press shaft assembly.

Referring now to FIG. 7 there is shown a pair of half journals 90 and a column 82. Half journal 90 is comprised of flange 92 and bearing portion 96. Flange 92 has holes 93 for receiving fasteners to attach half journal 90 to the inside of tube 85. The inner surface of bearing portion 96 has composite buttons 94 embedded therein. The buttons are press fit into recesses 98 which are formed along the inner surface of bearing portion 96. As with the buttons discussed in connection with the foregoing embodiments, buttons 94 are preferably comprised of polyimide graphite-fiber reinforced composite and are press-fit into the substrate material. As ram 84 moves, half journals 90 oscillate up and down along column 82. Accordingly, the inner surface of bearing portions 96 will slide against the outer surface of columns 82.

The present invention also finds advantageous use in a roughing stand or finishing stand for a metal rolling mill. Roughing stands and finishing stands are used to flatten a slab of steel or aluminum into a sheet (or bar or rod) of desired dimensions. For example, each stand may reduce the height of a slab by 28%. Accordingly, a slab of metal may be processed through a series of stands to obtain the desired sheet thickness.

Figure 8:
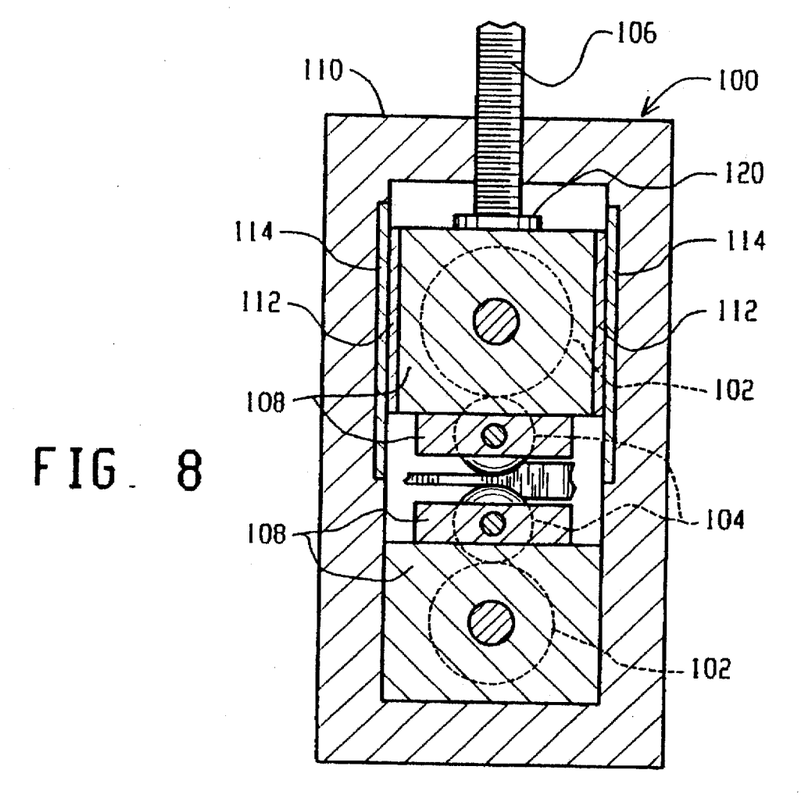
FIG. 8 is a cross-sectional side view of a finishing stand assembly.
Figure 10:
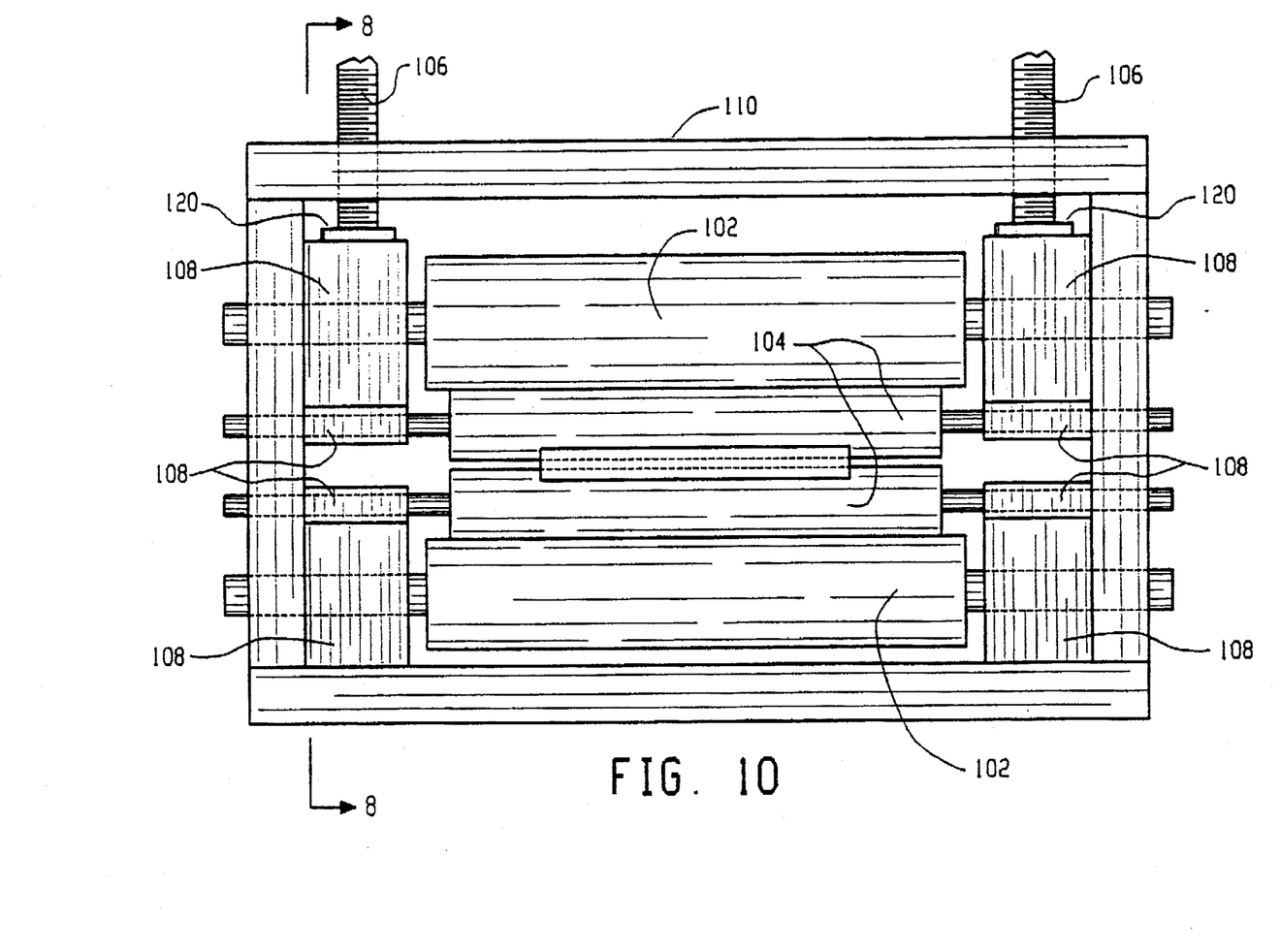
FIG. 10 is a front perspective view of the finishing stand assembly shown in FIG. 8.

Referring now to FIG. 8 there is shown a cross-sectional side view of a finishing stand 100 having backup or drive rolls 102, work rolls 104, screw 106, chocks 108, chock liner plates 112, housing 110, window plate 114 and hold-down or screw down washer 120. It should be noted that FIG. 8 shows only one side of the finishing stand 100, and that the other side is arranged in the same manner. A front perspective view of finishing stand 100 is shown in FIG. 10. Screw 106 exerts a downward force on hold-down washer 120, which exerts a downward force on chocks 108, which in turn put downward pressure on the upper drive rolls 102. Chock liner plate 112 is fixed to upper chock 108, while window plate 114 is fixed to housing 110. Accordingly, chock liner plate 112 moves relative to window plate 114 as chock 108 moves. Therefore, it would be advantageous to provide a bearing surface along chock liner plate 112, or window plate 114, or both. This bearing surface may take the form of the polymer composite buttons of the preferred embodiment of the present invention. Furthermore, the plate substrate is preferably bronze, or a steel shell with laminated material fastened thereto (as discussed above in connection with half journals 60).

Drive rolls 102 and work rolls 104 turn against one another to flatten a slab to the desired dimension. The dimension of the sheet exiting finishing assembly 100 is determined by the size of the gap between work rolls 104. The gap size is determined by the amount of downward force exerted by screw 106. Accordingly, it is important to be able to finely adjust screw 106 which bears down on hold-down washer 120. This requires hold-down washer 120 to have a bearing surface. Typically, drive rolls weigh approximately 80,000 lbs, while work rolls weigh approximately 30,000 lbs.

Figure 9:
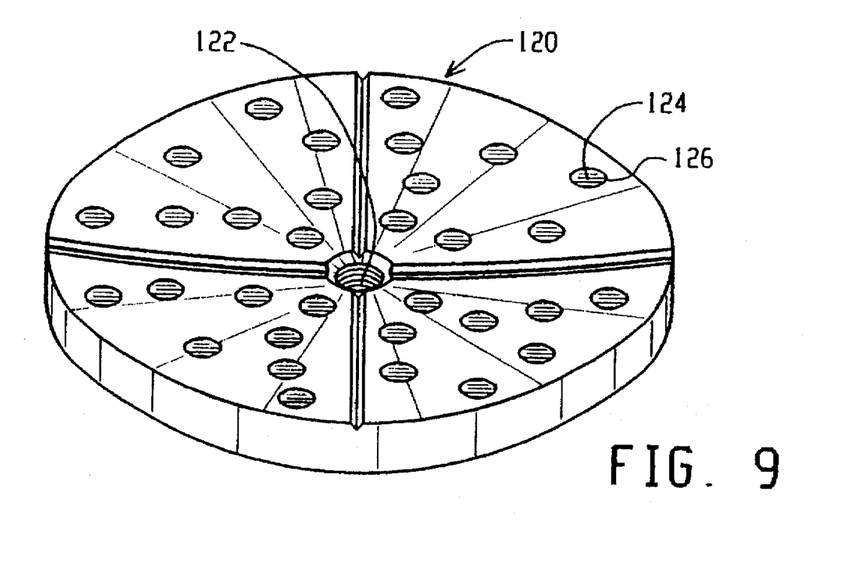
FIG. 9 is a perspective view of a hold-down or screw down washer for the finishing stand assembly of FIG. 8.

Referring now to FIG. 9 there is shown a hold-down washer 120 comprised of a bore 112 for securing the hold-down washer to a peg on chock 108. The surface of hold-down washer 120 has a curvature which conforms to the curvature of the end of screw 106. It also includes composite buttons 124 embedded therein. As with the prior embodiments, the buttons 124 are preferably comprised of a polyimide graphite-fiber reinforced composite and press fit into recesses 126 formed in hold-down washer 120. Screw 106 is screwed down onto the surface of hold-down washer 120 having buttons embedded therein. The bearing surfaces formed by composite buttons 124 allow screw 106 to adjust the tolerance of work rolls 104 quickly (i.e., with a short lag time) and with precision. It prevents a binding between screw 106 and the hold-down washer 120 and lessens any lag or hysteresis in the accompanying adjustment. As screw 106 is turned, the end of the screw will slide against the surface of hold-down washer 120.

Figure 11:
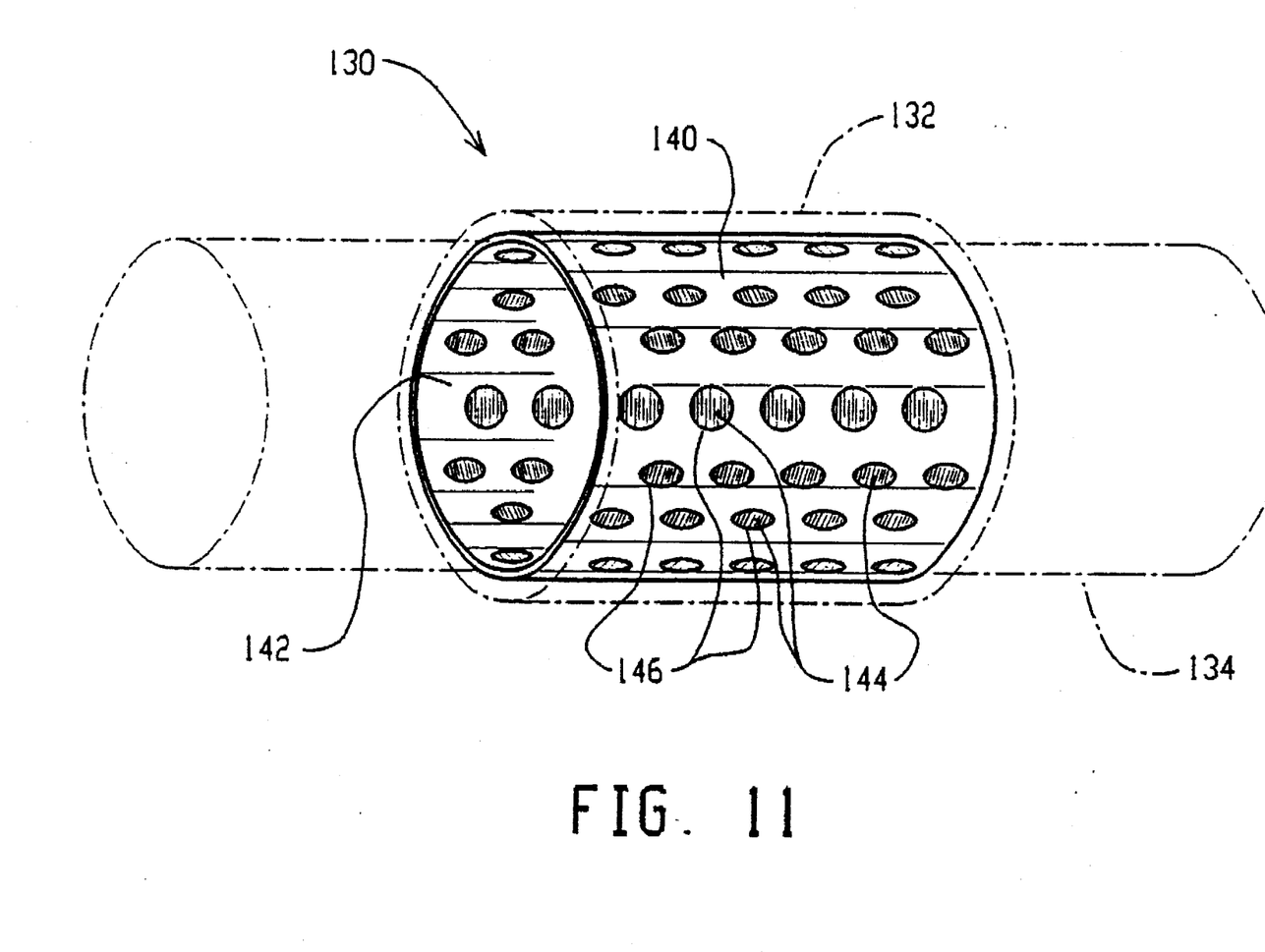
FIG. 11 is a perspective view of a rotating shaft assembly having a full journal.

Yet another application for the present invention is a full journal bearing for a rotating shaft assembly. Examples of rotating shaft assemblies include vertical edgers and guide boxes, which are used to guide and position a slab of aluminum or steel as it is conveyed through a mill. Referring now to FIG. 11, there is shown a typical rotating shaft assembly 130. Rotating shaft assembly 130 is generally comprised of a full journal 140, a roller housing 132 and a shaft 134. In the embodiment shown full journal 140 has a 0.25 inch wall and a plurality of holes or recesses 146 having a diameter of approximately 1.1875 inches. Composite buttons 144 are press fit into recesses 146. Specifically, recesses 146 have a diameter of 0.004 inches to 0.005 inches smaller than the diameter of composite buttons 144. The recesses 146 may extend partially or entirely through the wall of full journal 140. In the embodiment shown, the recesses 146 extend entirely through the wall of full journal 140 to form a hole in the wall of full journal 140. It should be noted that it may be necessary to form holes in the wall of full journal 140 for buttons 144 in cases where the diameter of full journal 140 is too small to fit a drill inside. Composite buttons 144 are preferably comprised of the polyimide graphite-fiber reinforced composite discussed above.

Full journal 144 is press fit into roller housing 132. Roller housing 132 preferably being constructed of steel. Shaft 134 is inserted through bore 142 of full journal 140. The shaft 134 will rotate relative to full journal 140. Preferably, the substrate of full journal 140 is comprised of a bronze material, such as AMPCO-18™.

It will be appreciated that the foregoing embodiments are merely examples of potential uses for the present invention. The present invention finds useful application in many other bearing arrangements, such as those discussed above in the Background of the Invention. Moreover, it can be used in the construction of aircraft brakes which sometimes must withstand high compressive loads under heated conditions.

The present invention has been described with reference to several preferred embodiments. Other modifications and alterations will occur to those skilled in the art upon a reading and understanding of the present specification. It is intended that all such modifications and alterations be included insofar as they come within the scope of the appended claims or equivalents thereof.

Having thus described the invention, the following is claimed:

1. A bearing arrangement having at least one bearing surface, said bearing arrangement comprising:

a substrate in the form of a hold-down washer, wherein said substrate has an upper surface which engages with screw means, said upper surface having a plurality of recesses formed therein; and members comprising a self-lubricating, polyimide graphite-fiber reinforced composite material, said members embedded in said plurality of recesses to provide a load bearing structural component of the bearing arrangement and a lubricating low friction film for the substrate.

2. A bearing arrangement having at least one bearing surface, said bearing arrangement comprising:

a substrate in the form of a full journal, wherein said substrate has a plurality of holes; and members comprising a self-lubricating, polyimide graphite-fiber reinforced composite material, said members embedded in said plurality of holes to provide a load bearing structural component of the bearing arrangement and a lubricating low friction film for the substrate.

3. A forgoing press assembly to shape hot metal, said forging press assembly comprising:

a base;

at least one pair of vertical columns anchored to and extending upwardly from said base;

a ram assembly movable on said columns, said ram assembly comprising:

two pairs of hall journals, each pair of half journals forming a cylinder around one of said two columns, wherein each half journal has an inner surface with a self-lubricating, polyimide graphite-fiber reinforced composite material embedded therein for engaging said column as said ram assembly moves on said columns, said composite material providing a bearing structural component of the ram assembly and a lubricating low friction film for the half journals;

an upper forging bit; and a lower stationary bit positioned a predetermined distance from said upper bit, said hot metal compressed between said upper forging bit and said lower stationary bit.

4. A stand assembly for flattening slabs of hot metal, said assembly comprising:

a pair of work rolls disposed between said chocks for flattening the slabs of metal;

a pair of drive rolls for rotating said work rolls;

a plurality of chocks for supporting the work rolls and the drive rolls;

a screw for moving said chocks, and said work and drive rolls towards or away from each other, and a hold-down washer having an upper surface engageable with said screw and a lower surface engageable with a chock, said upper surface having a self-lubricating, polyimide graphite-fiber reinforced composite material embedded therein for engaging said screw, said composite material providing a bearing structural component of the hold-down washer and a lubricating low-friction film for the upper surface, and a housing for housing said screw, said work rolls, said drive rolls, said plurality of chocks and said hold-down washer.

5. A rotating shaft assembly comprising:

a full journal having a bore and self-lubricating, polyimide graphite-fiber reinforced composite button means embedded therein, said full journal having an outer surface, said composite material providing a bearing structural component of the shaft assembly and a lubricating low friction film for the full journal; and a rotatable shaft insertable through said bore for rotating in bearing engagement with said self-lubricating button means.

* * * * *